(12) United States Patent
Sagawa

(10) Patent No.: US 9,799,447 B2
(45) Date of Patent: Oct. 24, 2017

(54) METHOD FOR MAKING NDFEB SINTERED MAGNET AND MOLD FOR MAKING THE SAME

(75) Inventor: Masato Sagawa, Kyoto (JP)

(73) Assignee: INTERMETALLICS CO., LTD., Kyoto (JP)

( * ) Notice: Subject to any disclaimer, the term of this patent is extended or adjusted under 35 U.S.C. 154(b) by 1004 days.

(21) Appl. No.: 12/673,937

(22) PCT Filed: Aug. 20, 2008

(86) PCT No.: PCT/JP2008/002251
§ 371 (c)(1),
(2), (4) Date: Feb. 17, 2010

(87) PCT Pub. No.: WO2009/025086
PCT Pub. Date: Feb. 26, 2009

(65) Prior Publication Data
US 2011/0070118 A1    Mar. 24, 2011

(30) Foreign Application Priority Data
Aug. 20, 2007    (JP) .................................. 2007-214074

(51) Int. Cl.
*B22F 1/00* (2006.01)
*H01F 41/02* (2006.01)
(Continued)

(52) U.S. Cl.
CPC .......... *H01F 41/0273* (2013.01); *B22F 3/087* (2013.01); *H01F 41/0266* (2013.01);
(Continued)

(58) Field of Classification Search
CPC .................................. B22F 1/00; H01F 1/057
(Continued)

(56) References Cited

U.S. PATENT DOCUMENTS 7,045,092 B2 *  5/2006  Ogawa et al. .................. 419/38
8,153,047 B2 *  4/2012  Groendahl et al. ........... 264/428
(Continued)

FOREIGN PATENT DOCUMENTS

CN      1636650 A      7/2005
CN      1969347 A      5/2007
(Continued)

OTHER PUBLICATIONS

Machine Translation of JP 2007-180375, Jul. 12, 2007.*
(Continued)

*Primary Examiner* — Jie Yang
(74) *Attorney, Agent, or Firm* — Oliff PLC

(57) ABSTRACT

A mold which is inexpensive and easy to process and does not embrittle. Also provided is a process by which a sintered NdFeB magnet can be produced using the mold without suffering bending or deformation. At least part (e.g., a bottom plate) of the mold is made of a carbon material. Carbon materials have lower friction with a sinter during sintering than metals. The mold hence enables a sintered NdFeB magnet to be produced without suffering the bending or deformation caused by friction due to sintering shrinkage. Carbon materials are inexpensive and easy to process. The mold does not embrittle even when repeatedly used. Such effects can be significantly produced when a carbon material is used as the bottom plate, on which the load of the sinter is imposed during sintering.

10 Claims, 6 Drawing Sheets

(a) LONGITUDINAL-SECTION VIEW (b) CROSS-SECTION VIEW

(51) Int. Cl.
 B22F 3/087 (2006.01)
 H01F 1/057 (2006.01)
(52) U.S. Cl.
 CPC ....... B22F 2998/00 (2013.01); B22F 2998/10 (2013.01); B22F 2999/00 (2013.01); C22C 2202/02 (2013.01); H01F 1/0577 (2013.01)
(58) Field of Classification Search
 USPC ............... 148/104, 302; 75/244; 419/12, 30
 See application file for complete search history.

(56) References Cited

U.S. PATENT DOCUMENTS

| | | | | |
|---|---|---|---|---|
| 8,545,641 | B2 * | 10/2013 | Sagawa et al. .............. | 148/103 |
| 2002/0012600 | A1 * | 1/2002 | Tokuhara et al. .............. | 419/30 |
| 2002/0159909 | A1 * | 10/2002 | Oota et al. .................... | 419/29 |

FOREIGN PATENT DOCUMENTS

| | | |
|---|---|---|
| JP | A-07-153612 | 6/1995 |
| JP | A-2002-371383 | 12/2002 |
| JP | A-2006-265601 | 10/2006 |
| JP | A-2007-180373 | 7/2007 |
| JP | A-2007-180375 | 7/2007 |
| KR | 20070043782 A | 4/2007 |
| WO | WO 2006004014 A1 * | 1/2006 |
| WO | WO 2006/046838 A1 | 5/2006 |

OTHER PUBLICATIONS

English Machine Translation of JP 07-153612, Tokuhara et al., dated Jun. 16, 1995.*
English Machine Translation of JP 2006-265601, Takebuchi et al., dated Oct. 5, 2006.*
English Machine Translation of JP 2007-180375, Sagawa et al., dated Jul. 12, 2007.*
Crystallography and Engineering Properties of Ceramics: Graphite, ASM Handbook, 2002, pp. 1-3.*
Special Type of Graphite, Dalian Thrive Metallurgy Import and Export Co., Ltd., 2005, pp. 1-6.*
Extended European Search Report issued in Application No. 08827794.2 dated Jul. 22, 2011.
Dec. 7, 2011 Office Action issued in Chinese Patent Application No. 200880102582.7 (with translation).
Written Opinion of the International Searching Authority issued in International Application PCT/JP2008/002251 dated Nov. 18, 2008 (with English-language translation).
International Preliminary Report on Patentability issued in International Application PCT/JP2008/002251 dated Mar. 9, 2010 (with English-language translation).
International Search Report issued in International Application PCT/JP2008/002251 dated Nov. 18, 2008 (with English-language translation).
Mar. 29, 2011 Office Action issued in Japanese Patent Application No. 2007-214074 (with translation).
Jun. 5, 2012 Office Action issued in Chinese Patent Application No. 200880102582.7 (with translation).
Apr. 9, 2013 Chinese Office Action and Reason for Rejection issued in Chinese Patent Application No. 200880102582.7 (with translation).
Jun. 3, 2014 Office Action issued in European Patent Application No. 08827794.2.
Jun. 17, 2014 Office Action issued in Korean Patent Application No. 10-2010-7004164 (with translation).
Nov. 24, 2014 Korean Office Action issued in Korean Patent Application No. 10-2010-7004164.
Feb. 9, 2015 Chinese Notification of Reexamination issued in Chinese Patent Application No. 200880102582.7.
Feb. 19, 2015 Canadian Office Action issued in Canadian Patent Application No. 2,696,700.
Feb. 25, 2015 Korean Pretrial Reexamination Report issued in Korean Patent Application No. 10-2010-7004164.
Jun. 18, 2015 Office Action issued in European Patent Application No. 08 827 794.2.
Nov. 22, 2016 Office Action issued in Korean Application No. 10-2010-7004164.
May 12, 2017 Office Action issued in Chinese Application No. 201510524015.2.
Jun. 10, 2015 Office Action issued in Chinese Application No. 200880102582.7.
Sep. 27, 2016 Office Action issued in Chinese Application No. 201510524015.2.
Sep. 9, 2016 Extended European Search Report issued in European Application No. 16172668.2.

* cited by examiner (a) LONGITUDINAL-SECTION VIEW (b) CROSS-SECTION VIEW (a) LONGITUDINAL-SECTION VIEW (b) CROSS-SECTION VIEW (a) LONGITUDINAL-SECTION VIEW (b) CROSS-SECTION VIEW (a) LONGITUDINAL-SECTION VIEW (b) CROSS-SECTION VIEW (a) LONGITUDINAL-SECTION VIEW (b) CROSS-SECTION VIEW

<COMPARATIVE EXAMPLE>

H ← DIRECTION OF MAGNETIC ORIENTATION

| MAGNETIC POLES | SAMPLE POSITION | $B_r$(kG) | $H_{cJ}$(kOe) | $(BH)_{max}$ (MGOe) | $B_r/J_s$(%) |
|---|---|---|---|---|---|
| NO | A | 13.376 | 16.500 | 41.82 | 91.3 |
|  | B | 13.941 | 16.039 | 45.92 | 94.9 |
|  | C | 14.050 | 15.792 | 46.79 | 95.9 |
| PROVIDED | A | 13.908 | 16.237 | 45.76 | 95.0 |
|  | B | 14.017 | 16.011 | 46.56 | 95.5 |
|  | C | 14.047 | 15.975 | 46.81 | 95.8 |

METHOD FOR MAKING NDFEB SINTERED MAGNET AND MOLD FOR MAKING THE SAME

TECHNICAL FIELD

The present invention relates to a method for making a NdFeB system sintered magnet. In particular, it relates to a method for making a NdFeB system sintered magnet having an intended form by the following processes: filling a container (which will hereinafter be referred to as "mold") designed to match the shape and size of the product with an alloy powder for a NdFeB system sintered magnet (which will hereinafter be referred to as "alloy powder"); applying a magnetic field to the alloy powder to align the crystal orientation of the powder; and heating the whole container with the alloy powder filled therein to be sintered. Hereinafter, these processes will be collectively referred to as "press-less process."

BACKGROUND ART

As described in Patent Document 1, conventional press-less processes consist of the following procedures: filling a mold with an alloy powder having an average particle size of 2 through 5 μm in such a manner that the filling density becomes 2.7 through 3.5 $g/cm^3$; placing a lid on the mold; applying a magnetic field to the powder for orientation; sintering the powder; and taking out the sintered compact from the mold to perform an aging treatment. Although the method of measuring the aforementioned average particle size is not explicitly stated in Patent Document 1, it was probably measured using Fisher's method which was commonly used at the time when the document was filed.

Conventionally, materials used for the mold include Mo, W, Ta, Pt, and Cr, which are considered to be preferable examples of metals that do not react with an alloy powder. However, the inventor of the present invention has noticed the significant problem that all of these metals have one or more of the following three disadvantages: (i) they are expensive, (ii) they are difficult to be machined, and (iii) they will be embrittled once heated.

Given this factor, the inventor of the present invention has devised the use of Fe—Ni alloy such as stainless steel or Permalloy, which are not mentioned in Patent Document 1, as the material of the mold (Patent Document 2).

It had been known that, in mass-producing a NdFeB sintered magnet, if a compact made by pressing an alloy powder is put on a metal plate or in a metallic container and is sintered, the alloy powder reacts with or strongly adheres to the Fe—Ni alloy and the magnet after the sintering is considerably deformed. This is probably the reason why a Fe—Ni alloy was not mentioned as a material for the mold in Patent Document 1. The inventor of the present invention has solved the problem regarding the reactivity with an alloy powder by coating the inside of a mold, and thereby they have devised a mold using a Fe—Ni alloy which is inexpensive, easy to be machined, and will not be embrittled (Patent Document 3).

[Patent Document 1] Japanese Unexamined Patent Application Publication No. H07-153612

[Patent Document 2] Japanese Unexamined Patent Application Publication No. 2007-180375

[Patent Document 3] Japanese Unexamined Patent Application Publication No. 2007-180373

DISCLOSURE OF THE INVENTION

Problem to be Solved by the Invention

The inventor of the present invention has noticed that, although it can prevent the reaction with an alloy powder as previously described, using a mold which is made of a Fe—Ni alloy and whose inside is appropriately coated cannot prevent the product from becoming slightly curved or slightly deformed after the sintering process. Accordingly, with such a mold, an object which is larger than the final product must be prepared beforehand by the press-less process, and then its curved portion must be removed by a machining process to obtain the final product. This brings about a problem of the low product yield.

The problem to be solved by the present invention is to provide a method in which a NdFeB system sintered magnet can be produced without being curved or deformed by using a mold which is inexpensive, easy to be machined, and will not be embrittled. The present invention also provides such a mold.

Means for Solving the Problem

The inventor of the present invention has discovered that using a carbon material at least in a part of the mold solves the previously described problem. This is attributable to the fact that the friction between a carbon material and the sintered compact is lower than that between the material of a conventional mold and the sintered compact and hence less impedes the shrinkage of the sintered compact which occurs when a sintered compact is produced by a sintering process. This discovery has led to the present invention.

That is, the present invention provides a method for making a NdFeB system sintered magnet which includes the processes of: filling a powder filling/sintering container (or mold) with a powder; orienting the powder with a magnetic field; and charging the whole mold into a sintering furnace to obtain a sintered compact without applying any mechanical pressure to the powder in the mold, wherein:

at least a part of the mold is made of a carbon material.

One of the most important matters to improve the magnetic properties of a sintered magnet in the process of making a NdFeB sintered magnet is to prevent impurities as much as possible, and carbon is the typical element which might be mixed as an impurity. Accordingly, it was conventionally considered unreasonable to use a carbon material as a material of a mold which directly contacts with the alloy powder. However, the inventor of the present invention has discovered through experiments that, contrary to the common knowledge, carbon do not react with an alloy powder to a significant degree in the ultralow-oxygen atmosphere, which is generally used in a sintering process for a NdFeB magnet. This finding has verified the effectiveness of the present invention.

The shape and size of the internal space of the mold is designed by taking into account the shrinkage in the sintering process as well as the shape and size of the final product.

In the method for making a NdFeB system sintered magnet according to the present invention, a part which serves as a bottom of the mold in the sintering process may preferably be made of the carbon material.

In the method for making a NdFeB system sintered magnet according to the present invention, the mold may include both a part made of a carbon material and a part made of metal. In this case, at least a portion of the metallic part may preferably be made of a ferromagnetic material. In addition, the ferromagnetic material may preferably be placed at both ends of the mold. Further preferably, the ferromagnetic material may be placed in such a manner as to surround the four sides of the internal space of the mold.

The present invention provides a mold for making a NdFeB system sintered magnet by the processes of: filling an inside of the mold with a powder, orienting the powder inside the mold with a magnetic field; charging the whole mold into a sintering furnace, and heating the powder in the mold without applying any mechanical pressure to the powder to obtain a sintered compact of the NdFeB sintered magnet, wherein:

at least a part of the mold is made of a carbon material.

The mold may include a plurality of cavities which are separated from each other by a plurality of divider plates.

Effects of the Invention

In the present invention, a carbon material, which has a low friction against a sintered compact, is used as the material of the mold. This enables the production of NdFeB system sintered magnets without bringing about a curve or deformation caused by a friction due to a sintering shrinkage. Furthermore, carbon materials have advantages in that they are inexpensive, easy to be machined, and will not be embrittled even after repeated uses of the mold. Such effects can be notably obtained by using a carbon material as the bottom of the mold, which is subjected to the load of the sintered compact in the sintering process.

The use of such mold that both a part made of a carbon material and a part made of metal are included and at least a portion of the metallic part is made of a ferromagnetic material increases the accuracy of the orientation of the magnetic field. In particular, providing the ferromagnetic material in such a manner as to surround the four sides of the internal space of the mold further increases the accuracy of the orientation of the magnetic field because the ferromagnetic material part forms a magnetically connected magnetic circuit.

EXPLANATION OF NUMERALS

11, 31 . . . Bottom Plate
12 . . . Side Plate/Top Plate
33, 42, 52 . . . Lid
21 . . . Wall
22, 54, 63 . . . Magnetic Pole
32 . . . Side Plate
35 . . . Thin Carbon Plate
36, 62 . . . Divider Plate
41 . . . Stainless Container
43, 53, 55, 64, 72 . . . NdFeB Sintered Magnet
51, 61 . . . Container
71 . . . Stainless Mold

BEST MODE FOR CARRYING OUT THE INVENTION

An embodiment of the method for making a NdFeB system sintered magnet and the mold for making a NdFeB system sintered magnet according to the present invention will be described with reference to FIGS. 1 through 5.

Figure 1:
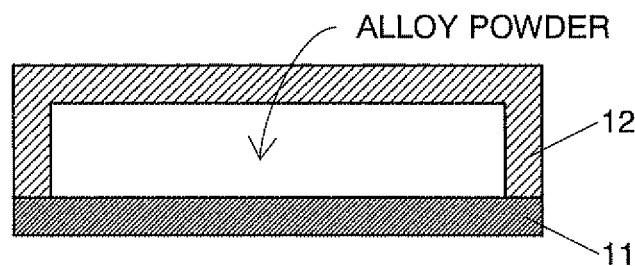
FIG. 1 is a longitudinal-section view and a cross-section view of a mold for making a NdFeB system sintered magnet which is an embodiment of the present invention, in which only the bottom plate 11 is made of a carbon material.
Figure 1:
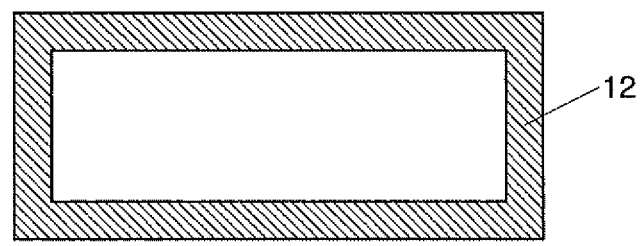

FIG. 1 is an example of a mold for making a NdFeB system sintered magnet according to the present invention. In this mold, only the bottom plate 11 is made of a carbon material, and the rest, or the side plate/top plate 12, is made of stainless steel. With this mold, the orientation of magnetic field can be performed either parallel or perpendicularly to the bottom plate 1. A coating (not shown) for preventing a reaction with an alloy powder is applied to the inner walls of the side plate/top plate 12. Applying a coating to stainless steel is detailed in Patent Document 3. The bottom plate 11 does not require the coating. The carbon plate may preferably has a thickness of 1 through 10 mm, in view of the strength and thermal conduction.

Figure 2:
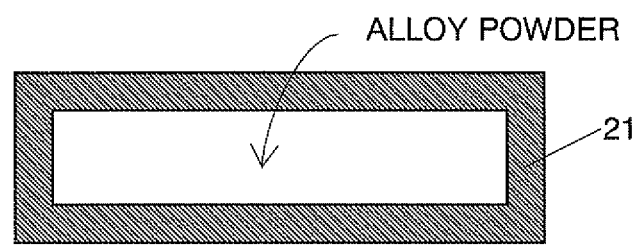
FIG. 2 is a longitudinal-section view and a cross-section view of a mold for making a NdFeB system sintered magnet in which all the walls are made of a carbon material.
Figure 2:
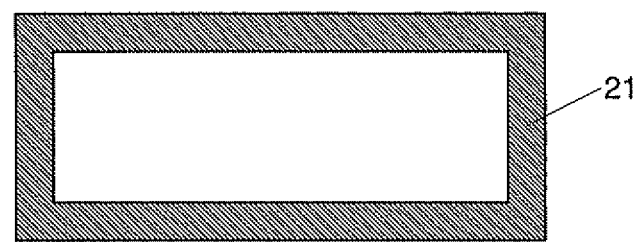

FIG. 2 shows a mold for making a NdFeB system sintered magnet in which all the walls 21 are made of a carbon material. Also with this mold, the orientation of magnetic field can be performed either parallel or perpendicularly to the bottom plate. An adequate mechanical strength might not be obtained only with the carbon material. In such a case, the outside of the walls may be covered with a metal case made of stainless steel or other materials. A mold made of only a carbon material as this has an advantage in that a preferable sintered compact can be obtained without applying any coating.

Figure 3:
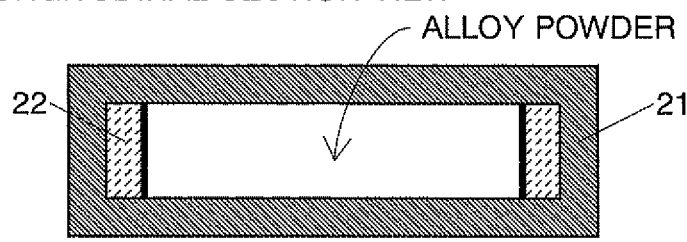
FIG. 3 is a longitudinal-section view and a cross-section view of a mold for making a NdFeB system sintered magnet in which magnetic poles 22 made of a ferromagnetic material are added at both ends of the mold of FIG. 2.
Figure 3:
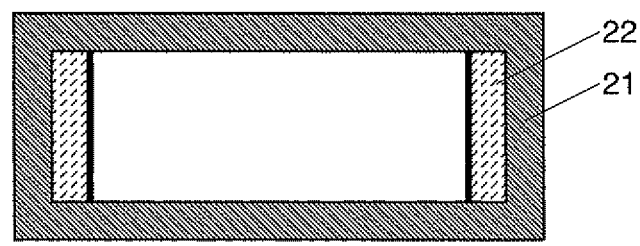

FIG. 3 shows a mold in which magnetic poles 22 made of a ferromagnetic material are added at both ends of the mold of FIG. 2. In this case, the orientation of magnetic field is performed parallel to the bottom plate of the walls 21. This mold can increase the degree of orientation of the sintered compact and decrease the dispersion of the degree of orientation, relative to the mold of FIG. 2. This effect is most likely attributable to the fact that the magnetic powder oriented by a pulsed magnetic field is attracted by the magnetic poles to be highly oriented and that this state remains. For the purpose of preventing the alloy powder from being fused to the magnetic poles 22 in the sintering process, a coating is performed or a thin plate made of a carbon material is attached to the side of the magnetic poles 22 that comes in contact with the alloy powder.

Figure 4:
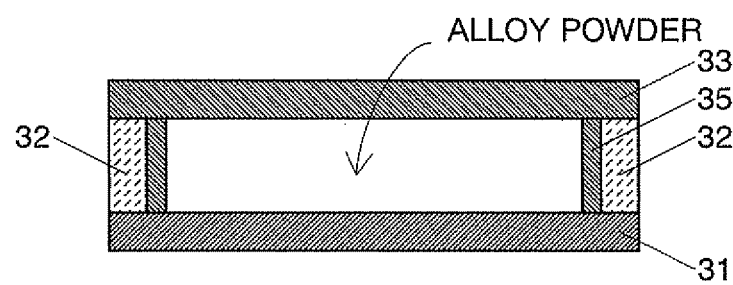
FIG. 4 is a longitudinal-section view and a cross-section view of a mold in which a bottom plate 31 and a lid 33 are made of a carbon material and a side plate 32 is made of a metallic ferromagnetic material.
Figure 4:
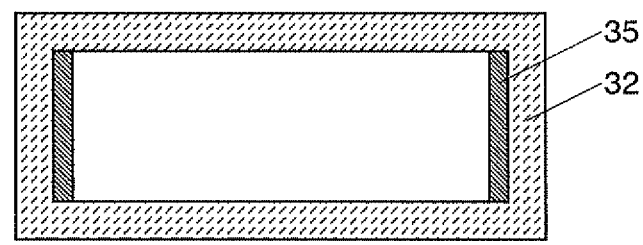

FIG. 4 shows a mold in which a bottom plate 31 and a lid 33 are made of a carbon material and a side plate 32 is made of a metallic ferromagnetic material. The side plate 32 surrounds the four sides of the space inside the mold. The inner walls of the two sides in the longitudinal direction among the four sides of the side plate 32 are coated (not shown) with boron nitride (BN) or other materials as described in Patent Document 3. For the remaining two sides, a thin plate 35 made of carbon is provided to their inner wall. The orientation of magnetic field is performed parallel to the bottom plate 31. When a magnetic field is applied parallel to the bottom plate 31 with the mold filled with an alloy powder, magnetic flux from the magnetic powder (or alloy powder) in the mold generates a closed circuit through the side plate 32 made of a ferromagnetic material. This decreases the intensity of the magnetic flux that leaks from the mold after the magnetic field is oriented. Accordingly, in the case where a plurality of molds are present in a sintering furnace, the interaction between the molds is reduced, facilitating the handling of the molds. In addition, the variation of orientations caused by such an interaction is reduced.

In the magnetic poles 22 and the side plate 32, the portions which act as the magnetic poles in the process of the orientation of magnetic field may preferably be a laminate of thin plates of ferromagnetic metal plates or a compact of powdery ferromagnetic metal. In such a laminate or a compact of powder, the thin plates or the grains in the powder are isolated from each other by a substance having a high electrical resistance. Accordingly, the eddy current in the magnetic poles is suppressed in the process of the orientation of magnetic field, which enhances the linearity of the magnetic lines of flux which pass through the magnetic powder and the magnetic pole. This further enhances the orientation of the magnetic powder. As a result, the deformation and the variation of magnetic properties of the sintered compact after the sintering process are suppressed, enabling the production of a high-quality NdFeB sintered magnet.

Figure 5:
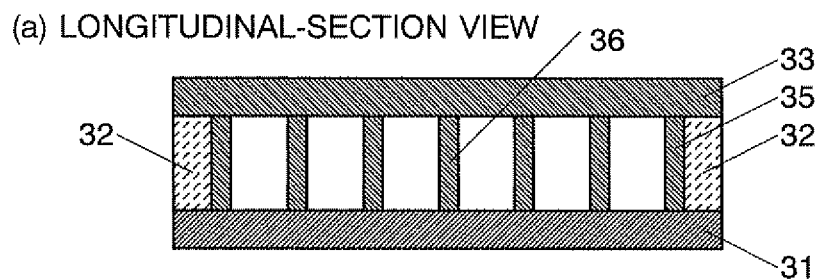
FIG. 5 is a longitudinal-section view and a cross-section view of a mold for making a NdFeB system sintered magnet including divider plates 36.
Figure 5:
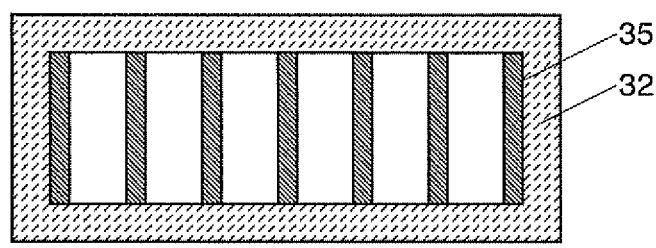

FIG. 5 shows a mold in which a plurality of divider plates 36 made of a carbon material are attached in the space inside the mold of FIG. 4. With this mold, one product is produced from each space separated by the divider plates 36. Therefore, many products can be made at a time.

The carbon material used in the method of the present invention is typically made by a powder-molding method, and includes the following kinds: carbonaceous extruded material; graphite extruded material; graphite pressed material; and isotropic graphite material. Among them, the isotropic graphite material, which has the highest density, is best for the method of the present invention. In the method of the present invention, the specific gravity, by which carbon materials can be classified, may be preferably not less than 1.7 g/cm$^3$ to ensure an adequate strength. As an alternative carbon material, a carbon fiber reinforced-carbon matrix-composite (which is called a C/C composite) is also a preferable material for the bottom plate 11 of FIG. 1, and for the bottom plate 31 and the lid 33 of FIGS. 4 and 5. In the process of tapping a powder to densely pack it in the mold, C/C composite materials are not easily damaged since they are strong even in a thin form, while carbon materials have a low mechanical strength and is easy to be damaged. Therefore, a C/C composite material is suitable as the material of the bottom plates and lids. As the divider plates of FIG. 5, metal plates made of stainless steel, molybdenum (Mo), or other materials can be used other than various carbon materials as previously described. In the case where metal plates are used, it is preferable to apply a coating with a BN powder or graphite powder and wax by the method described in Patent Document 3.

Embodiments

FIGS. 6 through 10 show embodiments of the molds of the present invention and examples of anisotropic NdFeB sintered magnets made by using these molds. Each figure is a picture including a mold and a sintered compact made therewith.

Figure 6:
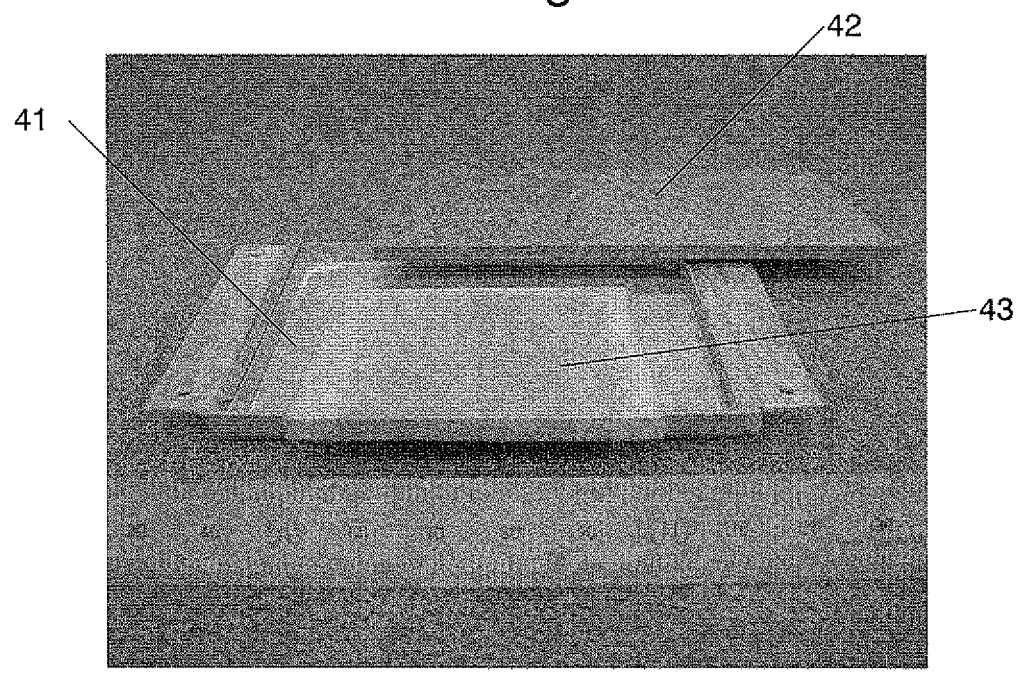
FIG. 6 is a picture showing an example of the mold according to the present invention and a NdFeB sintered magnet made by using the mold by the making method according to the present invention.

FIG. 6 is a picture of a mold composed of a nonmagnetic stainless container 41 which was made by a sheet metal processing and a lid 42 which was a C/C composite plate. A coating with BN and wax was performed to the inner walls of the stainless container 41. Using this mold, an NdFeB sintered magnet was produced. The magnetic powder used was prepared by grinding a NdFeB sintered magnet to powders with an average grain size of 3 m (which was measured by a laser method) by nitrogen jet milling without adding oxygen. The composition of the NdFeB sintered magnet in weight ratio was normal: 31.5% Nd, 1% B, 1% Co, 0.2% Al, 0.1% Cu, and the rest Fe. The amount of oxygen in the powder was 1500 ppm. The mold was filled with this powder to a filling density of 3.6 g/cm$^3$ in a glove box filled with high-purity Argon (Ar) with a dew point of not more than −70° C. After that, the lid 42 was attached, and a magnetic field of 6T was applied parallel to the lid to orient the magnetic powder. Then, the mold was so reversed that the lid 42 faced down (i.e. it became the bottom), and it was sintered in a vacuum of 2×10$^{-4}$ Pa at 985° C. As a result, as shown in FIG. 6, a very good-quality and high-density NdFeB sintered magnet 43 was obtained which has no curve, chip, or crack. The sintered density was 7.53 g/cm$^3$.

Figure 7:
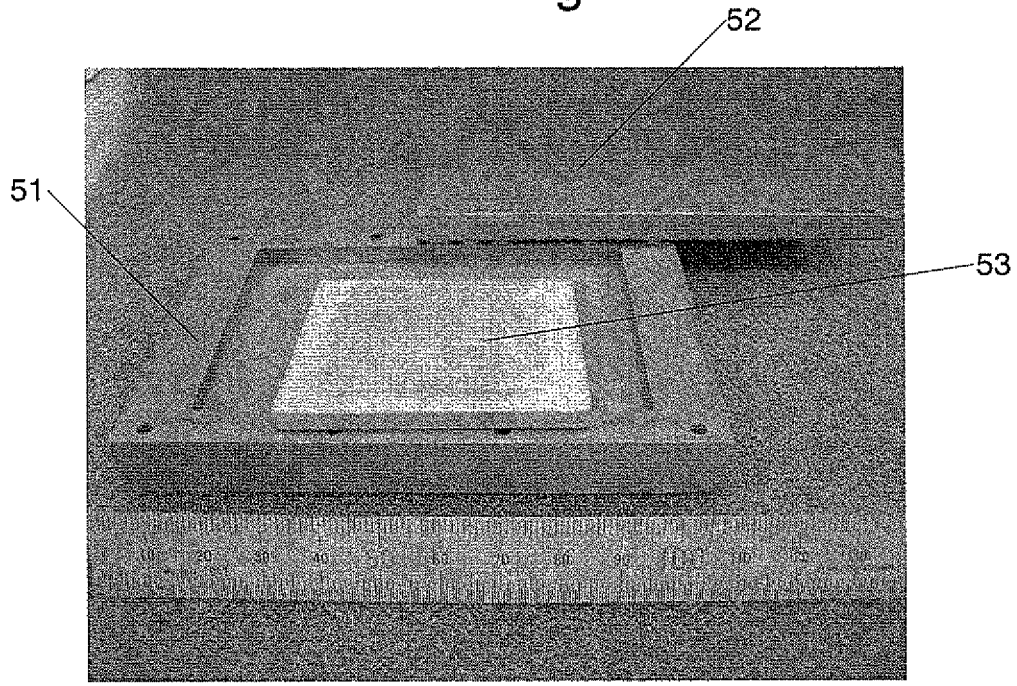
FIG. 7 is a picture showing an example of the mold made of only carbon according to the present invention and a NdFeB sintered magnet made by using the mold by the making method according to the present invention.

FIG. 7 shows a mold made of only a carbon material and a NdFeB sintered magnet made by using the mold. A container 51 of the mold was made of an isotropic graphite material with a specific gravity of 1.83 g/cm$^3$ and a lid 52 was made of a C/C composite carbon material. The magnetic powder used, the filling density, and the sintering temperature were the same as in the embodiment of FIG. 6. In this manner, a good-quality NdFeB sintered magnet 53 was produced without performing a coating to the inner walls of the mold before filling it with the powder. This is a great advantage of the use of a mold entirely made of carbon. It has been confirmed that the mold will have practically no damage after repeated uses and can repeatedly produce very good-quality sintered compacts. With a method using a conventional mold press, it is extremely difficult to individually produce NdFeB sintered magnets which are thin, large in area, and magnetized in the direction parallel to the plane, as in the present example. The method of the present invention makes it possible to produce such a low-profile NdFeB sintered magnet.

Figure 8:
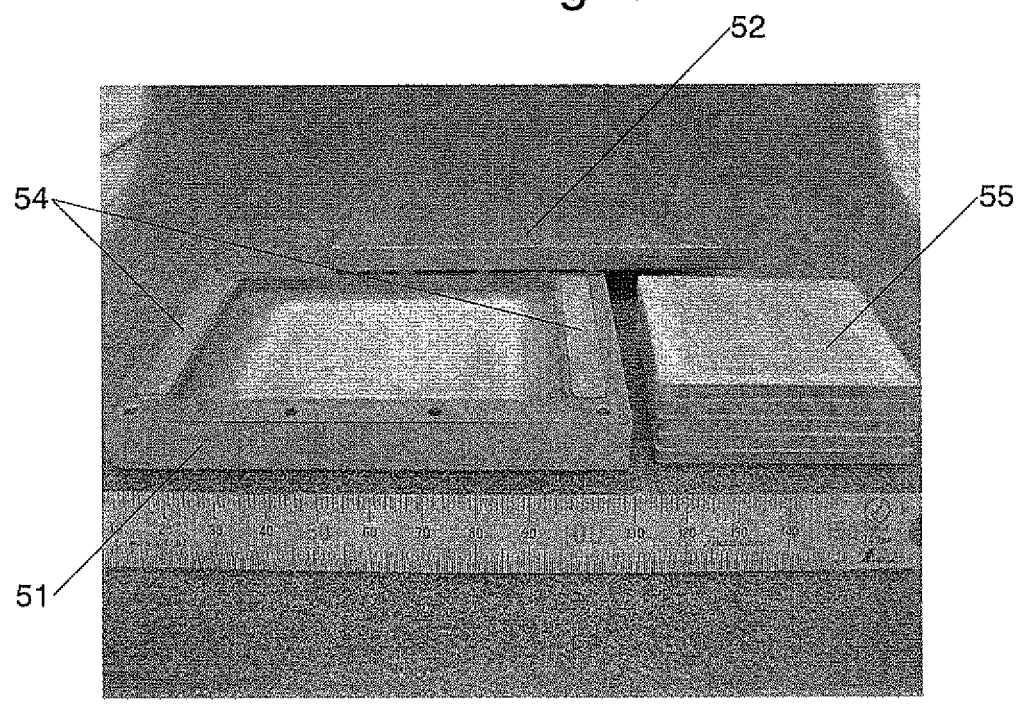
FIG. 8 is a picture showing an example of the mold including magnetic poles according to the present invention and a NdFeB sintered magnet made by using the mold by the making method according to the present invention.

FIG. 8 shows a mold which was entirely made of a carbon material as in FIG. 7 and in which magnetic poles 54 were additionally provided at both ends of the cavity. FIG. 8 also shows a NdFeB sintered magnet 55 made by using the mold. The method for making the NdFeB sintered magnet was the same as previously described, and under the same conditions, the production was performed five times. As is seen from this figure, with this method, an extremely low-profile and good-quality planar NdFeB sintered magnet can be obtained.

Figure 9:
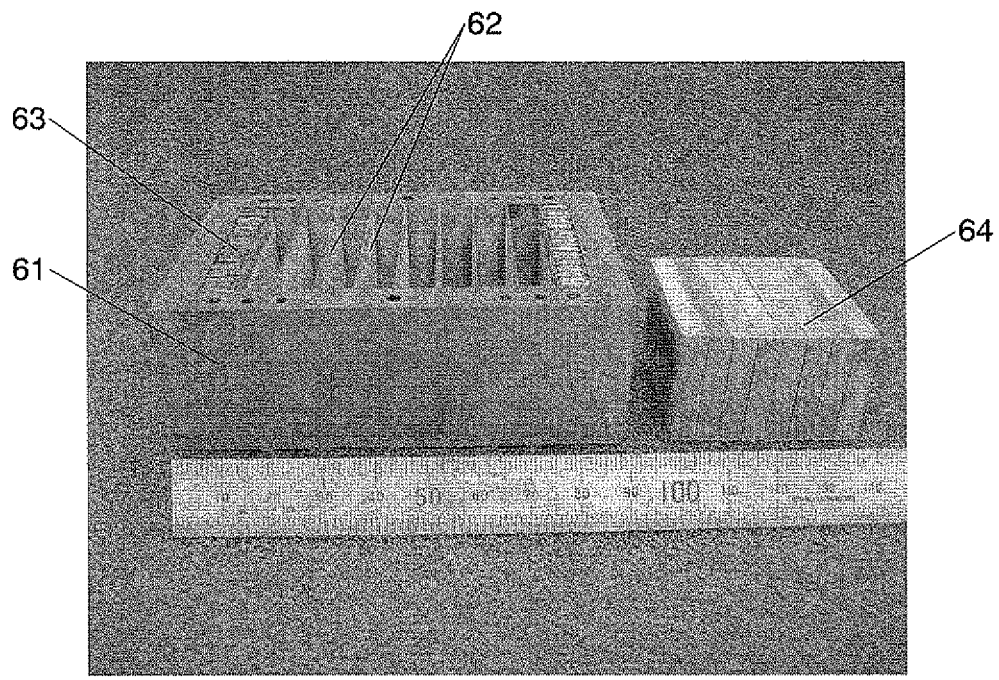
FIG. 9 is a picture showing an example of the mold including divider plates according to the present invention and a NdFeB sintered magnet made by using the mold by the making method according to the present invention.

FIG. 9 shows a mold composed of: a container 61 made of a carbon material; divider plates 62 made of a carbon material; and magnetic poles 63 at both ends of the container 61. FIG. 9 also shows a NdFeB sintered magnet 64 made with the mold. The powder used and the manufacturing conditions were the same as in the examples of FIGS. 6 through 8. It is clear that this mold enables an efficient production of many planar NdFeB sintered magnets. Furthermore, the use of a carbon material in the container 61 and the divider plates 62 saves a coating to the inner walls of the mold, reducing the cost.

Figure 10:
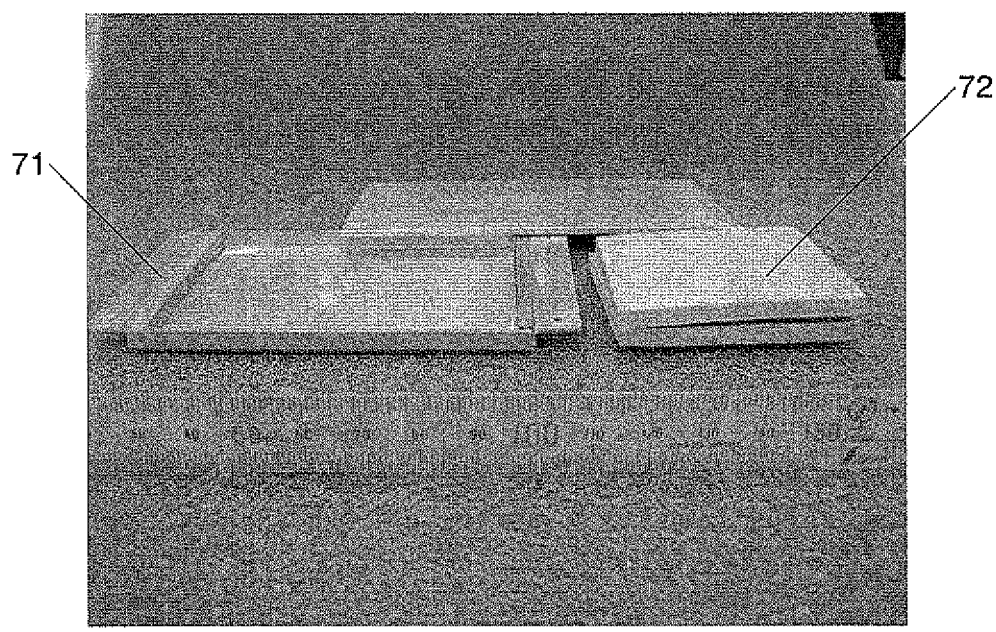
FIG. 10 is a picture showing an example of a mold of a comparative example and a NdFeB sintered magnet made by using the mold.

As a comparative example, FIG. 10 shows an example of making a NdFeB sintered magnet with a mold 71 which was entirely made of stainless steel without using a carbon material. A BN coating was performed to all the inner walls of the stainless mold 71. The powder used and the manufacturing conditions were the same as in the examples of FIGS. 6 through 9. To make a NdFeB sintered magnet by a press-less process using a mold entirely made of stainless steel, it is necessary to apply a flawless coating to the inner walls of the mold. Even the slightest flaw will cause adhesion of a sintered compact to the flaw portion, which makes the compact to be a defective product, and furthermore damages the mold. However, even if the coating to the mold is perfect, it is inevitable that the NdFeB sintered magnet 72 is slightly curved by the use of the stainless mold 71 as illustrated in FIG. 10. Such a curve is likely to occur due to the friction between the product (or powder) and the upper surface of the bottom plate while the powder which fills the mold shrinks to increase in density in the sintering process. This friction is assumed to occur as follows: a portion of the NdFeB alloy powder melts to form a liquid phase, and the liquid phase marginally penetrates through the interspaces of the BN powder to come in contact with the inner surface of the metallic mold. Such slight contacts cannot be avoided no matter how perfectly the coating is performed with a BN powder or other materials.

On the other hand, a curve does not occur in the present invention. The reason is assumed to be as follows: a reaction between the liquid phase of NdFeB alloy and carbon occurs to a very slight degree within the range of the temperatures for sintering a NdFeB sintered magnet. Accordingly, the friction between the product (or powder) and the upper surface of the carbon bottom plate during a sintering shrinkage is extremely low, and consequently the upper surface and lower surface of the product shrink equally. Since products without a curve can be produced, a machining process for making the final product is simplified, significantly improving the yield. Therefore, the price of the product can be reduced, which is very favorable.

Figures 11, 12:
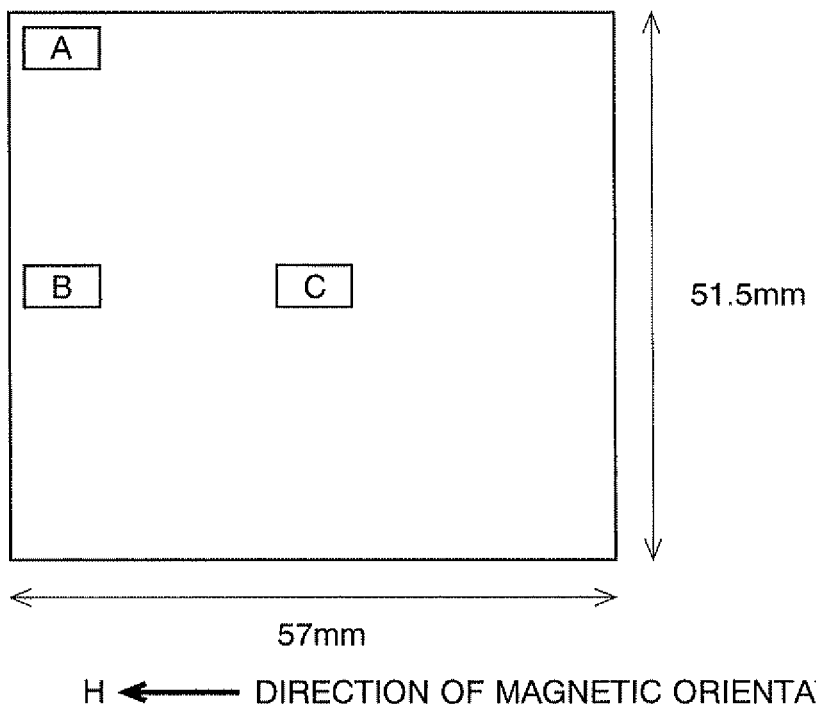
FIG. 11 is a top view showing the positions where samples were taken from a manufactured NdFeB sintered magnet to measure the magnetic properties.
FIG. 12 is a table showing the magnetic properties of the NdFeB sintered magnets made in the present embodiment.

A NdFeB sintered magnet was made by using molds which belonged to the types shown in FIG. 2 (without magnetic poles) and FIG. 3 (with magnetic poles) and was taller than the molds shown in FIGS. 6 through 9. The manufacturing conditions were as follows: filling density of 3.6 g/cm³; magnetic field for orientation of 6T; sintering temperature of 985° C.; sintering time of two hours; and the sintering process being followed by a quenching process from 800° C. and a heat treatment at 500° C. for two hours. These manufacturing conditions were applied to both molds. The shape and size of the cavity of the two molds were the same: 80 mm×60 mm×6.9 mm. The magnetization was performed in the direction of the side of 80 mm. The sizes of the two sintered compacts obtained were almost the same: 57 mm×51.5 mm×5.9 mm. From these sintered magnets, a rectangular parallelepiped of 7 mm×4 mm×7 mm (the magnetization was performed in the direction of one of the two 7 mm sides) was taken from each of the three positions (A. near a corner of the mold, B. near the center of one wall of the mold, and C. at the center of the cross section) shown in FIG. 11 and their magnetic properties were measured. FIG. 12 shows the magnetic properties of these three rectangular parallelepiped samples. This result demonstrates that a NdFeB system sintered magnet having an excellent magnetic properties can be obtained by the present invention, regardless of the presence of magnetic poles in the mold. In particular, as a NdFeB system sintered magnet including no dysprosium (Dy), the value of the coercive force $H_{cJ}$ was higher than those of the commercially available products by 3 through 4 kOe. Such a high coercive force is attributable to the use of a press-less process, in which a contamination by oxygen during the process is avoided as much as possible.

FIG. 12 also shows that the mold of FIG. 3 including magnetic poles has an averagely larger residual flux density $B_r$ and maximum energy product $(BH)_{max}$, and a smaller positional variation. In addition, with regard to the degree of orientation $B_r/J_s$, in the case where the mold of FIG. 2 including no magnetic poles was used, a positional variation was observed in which the degree of orientation $B_r/J_s$ was smaller at the center than at the corner of the sample. On the other hand, in the mold of FIG. 3 having magnetic poles, the degree of orientation was as high as 95% level regardless of the sampling positions. In particular, at the position A, the degree of orientation is much higher in the mold with magnetic poles than in the mold without magnetic poles. This shows that the mold in which ferromagnetic magnetic poles are provided at both ends of the cavity can produce products having better properties and smaller variance of the properties than the mold made of only a carbon material.

The invention claimed is:

1. A method for making a NdFeB system sintered magnet which includes a process of:
    filling a powder filling/sintering container (which will hereinafter be referred to as a "mold") with an alloy powder;
    orienting the alloy powder with a magnetic field;
    charging the whole mold into a sintering furnace; and
    heating the alloy powder in the mold without applying any mechanical pressure to the alloy powder to obtain a sintered compact, wherein:
        a shape of an internal space of the mold is designed by taking into account a shape of a final product of the NdFeB system sintered magnet,
        at least a part of an inside of the mold in which a friction occurs with the sintered compact when the sintered compact shrinks by the heating is made of a carbon material, and
    wherein the method further includes a process of:
        attaching a lid of the mold to a body of the mold after the filling process; and
        after attaching the lid of the mold and reversing the mold so that the lid faces down, performing the heating process.

2. The method for making the NdFeB system sintered magnet according to claim 1, wherein a part which serves as a bottom of the mold in the sintering process is made of the carbon material.

3. The method for making the NdFeB system sintered magnet according to claim 1, wherein the mold includes both
(i) a part made of the carbon material; and
(ii) a part made of metal.

4. The method for making the NdFeB system sintered magnet according to claim 3, wherein at least a portion of the metallic part is made of a ferromagnetic material.

5. The method for making the NdFeB system sintered magnet according to claim 4, wherein the ferromagnetic material is placed at both ends of the mold and a magnetic field is applied in the direction connecting the both ends to perform the orientation of the magnetic field.

6. The method for making the NdFeB system sintered magnet according to claim 5, wherein the ferromagnetic material is placed in such a manner as to surround four sides of an internal space of the mold.

7. The method for making the NdFeB system sintered magnet according to claim 1, wherein the heating is performed in a vacuum.

8. The method for making the NdFeB system sintered magnet according to claim 1, wherein the at least part of the inside of the mold is made of a graphite material and the graphite material is any one of a graphite extruded material, graphite pressed material, and an isotropic graphite material.

9. The method for making a NdFeB system sintered magnet according to claim 8, wherein the graphite material is an isotropic graphite material.

10. The method for making the NdFeB system sintered magnet according to claim 1, wherein the part of the inside of the mold is made of at least one of a carbonaceous extruded material, a graphite material, and a carbon fiber reinforced-carbon matrix composite.

* * * * *